(12) United States Patent
Marathe et al.

(10) Patent No.: US 7,606,202 B2
(45) Date of Patent: Oct. 20, 2009

(54) METHODS, SYSTEMS, AND COMPUTER PROGRAM PRODUCTS FOR OFFLOADING CALL CONTROL SERVICES FROM A FIRST NETWORK OF A FIRST TYPE TO A SECOND NETWORK OF A SECOND TYPE

(75) Inventors: Rohini Marathe, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/881,726

(22) Filed: Jul. 27, 2007

(65) Prior Publication Data
US 2008/0031196 A1    Feb. 7, 2008

Related U.S. Application Data

(60) Provisional application No. 60/834,103, filed on Jul. 28, 2006.

(51) Int. Cl.
*H04W 4/00* (2009.01)
(52) U.S. Cl. ...................... 370/331; 455/456.3
(58) Field of Classification Search ................ None
See application file for complete search history.

(56) References Cited

U.S. PATENT DOCUMENTS

| 6,359,979 | B1 |   | 3/2002 | Wang et al. |
| 6,735,621 | B1 | * | 5/2004 | Yoakum et al. ............. 709/218 |
| 6,836,477 | B1 |   | 12/2004 | West, Jr. et al. |
| 6,865,266 | B1 |   | 3/2005 | Pershan |
| 6,975,855 | B1 | * | 12/2005 | Wallenius ................ 455/417 |
| 7,027,433 | B2 | * | 4/2006 | Tuohino et al. ............ 370/352 |
| 7,031,747 | B2 | * | 4/2006 | Cyr et al. ................ 455/552.1 |
| 7,085,260 | B2 | * | 8/2006 | Karaul et al. ............. 370/352 |
| 7,136,651 | B2 | * | 11/2006 | Kalavade .................. 455/445 |
| 7,372,826 | B2 | * | 5/2008 | Dahod et al. .............. 370/328 |

(Continued)

FOREIGN PATENT DOCUMENTS

WO    WO 2008/103333 A1    8/2008

(Continued)

OTHER PUBLICATIONS

Notification of Transmittal of the International Search Report and the Written Opinion of the International Searching Authority, or the Declaration for International Application No. PCT/US07/16974 (Sep. 11, 2008).

(Continued)

*Primary Examiner*—Ajit Patel
(74) *Attorney, Agent, or Firm*—Jenkins, Wilson, Taylor & Hunt, P.A.

(57) ABSTRACT

Methods, systems, and computer program products for offloading call control services from a first network of a first type to a second network of a second type are disclosed. According to one aspect, a method includes detecting a call originating from a calling party in a first network of a first type. A database may be queried using information identifying the calling party. In response to the query, routing information may be for a node in a second network of a second type. Call control services may be offloaded for the call to the second network using the node.

31 Claims, 10 Drawing Sheets

U.S. PATENT DOCUMENTS

| | | | |
|---|---|---|---|
| 7,403,517 B2 * | 7/2008 | Westman | 370/352 |
| 2001/0040957 A1 | 11/2001 | McCann et al. | |
| 2004/0184435 A1 | 9/2004 | Westman | |
| 2005/0111641 A1 * | 5/2005 | Koskinen et al. | 379/114.2 |
| 2005/0281399 A1 | 12/2005 | Moisey et al. | |
| 2006/0079236 A1 | 4/2006 | Del Pino et al. | |
| 2006/0105766 A1 | 5/2006 | Azada et al. | |
| 2006/0291488 A1 | 12/2006 | Naqvi et al. | |
| 2008/0160995 A1 * | 7/2008 | Thiebaut et al. | 455/433 |
| 2008/0198862 A1 | 8/2008 | Bantukul et al. | |
| 2008/0198996 A1 | 8/2008 | Bantukul et al. | |
| 2008/0198999 A1 | 8/2008 | Bantukul et al. | |
| 2008/0254833 A1 * | 10/2008 | Keevill et al. | 455/558 |
| 2009/0047932 A1 * | 2/2009 | McNamara et al. | 455/411 |
| 2009/0052415 A1 * | 2/2009 | Ishii et al. | 370/338 |
| 2009/0109903 A1 * | 4/2009 | Vikberg et al. | 370/329 |

FOREIGN PATENT DOCUMENTS

| | | |
|---|---|---|
| WO | WO 2008/103334 A1 | 8/2008 |
| WO | WO 2008/103337 A1 | 8/2008 |

OTHER PUBLICATIONS

Notification of Transmittal of the International Search Report and the Written Opinion of the International Searching Authority, or the Declaration for International Application No. PCT/US08/02150 (May 20, 2008).

Notification of Transmittal of the International Search Report and the Written Opinion of the International Searching Authority, or the Declaration for the International Application No. PCT/US08/02154 (May 20, 2008).

Notification of Transmittal of the International Search Report and the Written Opinion of the International Searching Authority, or the Declaration for International Application No. PCT/US08/02147 (May 20, 2008).

Commonly assigned, co-pending U.S. Patent Application, "Methods, Systems, and Computer Readable Media for Providing Next Generation Network (NGN)-Based End User Services to Legacy Subscribers in a Communications Network," filed Jun. 2, 2009.

* cited by examiner

METHODS, SYSTEMS, AND COMPUTER PROGRAM PRODUCTS FOR OFFLOADING CALL CONTROL SERVICES FROM A FIRST NETWORK OF A FIRST TYPE TO A SECOND NETWORK OF A SECOND TYPE

RELATED APPLICATIONS

This application claims the benefit of U.S. Provisional Patent Application Ser. No. 60/834,103, filed Jul. 28, 2006; the disclosure of which is incorporated herein by reference in its entirety.

TECHNICAL FIELD

The subject matter disclosed herein relates generally to call control services. More particularly, the subject matter disclosed herein relates to offloading call control services.

BACKGROUND

Commonly deployed wireless communications networks support both voice and data services. Typically, mobile handsets or mobile subscribers are connected to a base transceiver station using a radio access network that uses a modulation scheme such as code division multiple access (CDMA) or global system for mobile communications (GSM). The base transceiver stations are connected via fixed links to one or more base station controllers, and the base station controllers are aggregated into switches called mobile switching centers. Mobile switching centers are connected to the public land mobile network/public switched telephone network (PLMN/PSTN), typically through a gateway switch called the gateway mobile switching center (GMSC).

Internet protocol (IP) multimedia subsystem (IMS) is defined by the Third Generation Partnership Project (3GPP) as a mobile network infrastructure that enables the convergence of data, speech, and mobile network technology over an IP-based infrastructure. IMS bridges the gap between the existing traditional telecommunications technology, such as PSTN, and Internet technology, allowing network operators to offer a standardized, reusable platform with new, innovative services by enhancing real time, multimedia mobile services, such as voice services, video telephony, messaging, conferencing, and push services. IMS can be used to provide services for both mobile networks and fixed networks at the same time, providing unique mixtures of services with transparency to the end-user. IMS is one example of a session initiation protocol (SIP)-based network. Another example of a SIP-based network is a next generation network (NGN) network.

IMS supports the establishment of any type of media session (e.g., voice, video, text, etc.) and provides the service creator the ability to combine services in the same session and dynamically modify sessions "on the fly" (e.g., adding a video component to an existing voice session). As a result, new and innovative user-to-user and multi-user services become available, such as enhanced voice services, video telephony, chat, push-to-talk, and multimedia conferencing, all of which are based on the concept of a multimedia session. The underlying IMS infrastructure enables mobile IP communication services via its ability to find a user in the network and then to establish a session with the user. The key IMS components enabling mobility management are the call session control function (CSCF) and home subscriber server (HSS). The CSCF is essentially a proxy, which aids in the setup and management of sessions and forwards messages between IMS networks. The HSS holds all of the key subscriber information and enables users (or servers) to find and communicate with other end users.

A wireline or wireless subscriber may benefit from the call control services provided by both networks. Sometimes the services operated in the different networks provided to a subscriber may overlap. For example, an IMS network may provide the same call control service as a PSTN or 2G wireless network. In some instances, it may be advantageous to offload call control service from one network to another network of a different type. Exemplary network types include 2G wireless networks (e.g., Global System for Mobile Communications (GSM), Interim Standard-41 (IS-41)), Public Switched Telephone Network (PSTN), Next Generation Network (NGN), and IMS networks. For example, the services provided by an IMS network may be cheaper than the PSTN. In this case, it would be advantageous to offload call control services from the PSTN to the IMS network.

Accordingly, there exists a need for methods, systems, and computer program products for offloading call control services from one network to another network of a different type.

SUMMARY

According to one aspect, the subject matter described herein includes a method for using an originating party query to offload call control services from a first network of a first type to a second network of a second type. The method includes detecting a call originating from a calling party in a first network of a first type. A database may be queried using information identifying the calling party. In response to the query, routing information may be for a node in a second network of a second type. Call control services may be offloaded for the call to the second network using the node.

BRIEF DESCRIPTION OF THE DRAWINGS

Exemplary embodiments of the subject matter will now be explained with reference to the accompanying drawings, of which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, or transport the program for use by or in connection with the instruction execution system, apparatus, or device. Specific examples (a non exhaustive list) of the computer-readable medium can include the following: a portable computer diskette, a random access memory (RAM), a read-only memory (ROM), an erasable programmable read-only memory (EPROM or Flash memory), and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

Figure 1:
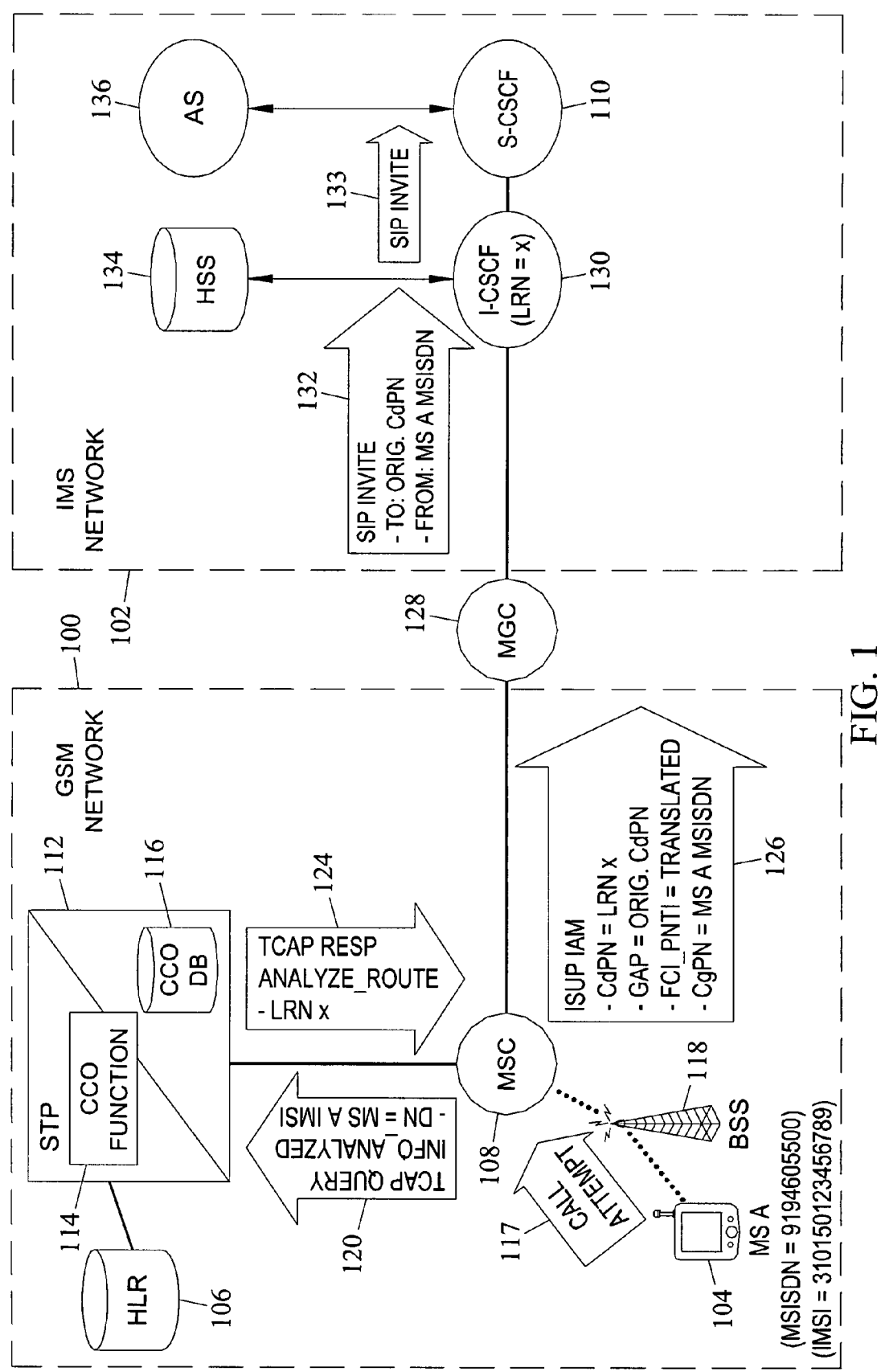
FIG. 1 is a network diagram of an exemplary system for using an originating party query to offload call control services from a first network of a first type to a second network of a second type according to an embodiment of the subject matter described herein.

Methods, systems, and computer program products for using an originating party query to offload call control services from a first network of a first type to a second network of a second type according to embodiments of the subject matter described herein may be implemented in one or more of any suitable network components or network devices. For example, the methods, systems, and computer program products may be implemented in a routing node, a signal transfer point (STP), a router, a switch, a gateway, a media gateway controller, a softswitch, an IMS node with PSTN gateway functionality, an NGN node, a service control point, an application server, or other suitable network device. FIG. 1 is a network diagram illustrating an exemplary system for using an originating party query to offload call control services from a first network 100 of a first type to a second network 102 of a second type according to an embodiment of the subject matter described herein. In this example, networks 100 and 102 are a GSM network and an IMS network, respectively. Further, in this example, the call is originated by a mobile subscriber device 104. Although FIG. 1 illustrates the offloading of call control services from a GSM network to an IMS network, those skilled in the art realize that the present subject matter is not limited to the depicted embodiment and is applicable to any system including networks of different types. Referring to FIG. 1, mobile subscriber device 104 may be registered with a 2G HLR 106, which maintains authentication and registration information associated with mobile subscriber device 104 and other mobile subscribers. Further, for example, HLR 106 may store service profile, location information, and activity status of mobile subscriber device 104. During operation, mobile subscriber device 104 may be assigned to a serving MSC 108, which may provide telephony switching services and mobility functions.

Mobile subscriber device 104 may be any suitable wireless communications device for performing calling functions, such as a mobile phone and a smartphone. In this example, mobile subscriber device 104 is a 2G phone capable of operating in GSM network 100. When operating within GSM network 100, call control services for mobile subscriber device 104 may be offloaded from GSM network 100 to an IMS serving-call session control function (S-CSCF) 110 in accordance with the subject matter described herein.

MSC 108 may download initial detection point (IDP) trigger information from HLR 106 for detecting call origination attempts from GSM network 100. In particular, MSC 108 may download and store an IDP trigger for detecting when a call originates from mobile subscriber device 104, the calling party for the call, while in GSM network 100. An example of triggering information may include an identifier for mobile subscriber device 104 that is contained in a received call attempt message. MSC 108 may trigger on detection of the triggering information in a received call attempt message 117. After triggering based on the call attempt by mobile subscriber device 104, MSC 108 may communicate a query message to an STP 112. The query message may be a TCAP Info-Analyzed message that contains the identifier for the calling mobile subscriber device 104. In one embodiment, the query message may be similar to a number portability query message, where the query message includes calling party identifier information instead of or in addition to called party identifier information. The query message may be sent for requesting a routing number for a node in IMS network 102 that may be used to provide call control services for the call.

STP 112 may include a call control offload (CCO) function 114 for offloading call control services from GSM network 100 to IMS network 102. In particular, STP 112 may receive from MSC 108 the query message containing an identifier for calling mobile subscriber device 104. In response to receiving the query message, CCO function 114 may query a CCO database 116 for routing information using the calling party identifier information. In response to the query, function 114 may obtain routing information for a node in IMS network 102 that is operable to provide call control services for the call. Exemplary routing information includes a local routing number (LRN), a network entity address, an MSC address, a Gateway MSC address, a Gateway routing node address, a Signaling System 7 (SS7) point code address, an Internet protocol (IP) address, and a uniform resource identifier (URI) address. Next, a response message 124 may be communicated to MSC 108 containing routing information (e.g., LRN) for offloading call control services for the call to IMS network 102. MGC 108 may then route the call to the IMS network by sending an ISUP IAM message to MSC 128 where the IAM message includes the LRN of the IMS node. In one embodiment, the LRN may be included in a called party number (CdPN) parameter in the IAM message. MGC 128 may terminate the IAM message, determine the IMS node corresponding to the LRN (in this case, I-CSCF 130) and may generate and send a SIP INVITE message to I-CSCF 130. MGC 128 may, for example, obtain additional routing information for I-CSCF 130 by performing a DNS or ENUM lookup based on the LRN stored in the CdPN field of the IAM message. In one embodiment, MGC 128 may access a database that associates LRN values to IMS node addresses, and in this manner an LRN may be translated into a routable IMS address.

In response to the INVITE message, I-CSCF 130 may query HSS 134 to determine the serving CSCF with which mobile subscriber device 104 is registered and may generate and transmit a SIP INVITE message to S-CSCF 110 with which device 104 is registered. S-CSCF 110 may then provide call control services for the call. For example, S-CSCF 110 may route the call through a media gateway (not shown) in IMS network 102 to reduce toll charges. Thus, in one example, offloading call control services from a first network of a first type to a second network of a second type may include offloading the call itself to the second network. In other examples, the call control services may include advanced call control services that can be provided more efficiently by the second network. For example, S-CSCF 110 may provide advanced call control services such as call forwarding, call waiting, presence service, prepaid service, voice mail service, etc. using application server 106. Any one or more of these or other call control services may be offloaded to the second network of the second type using the methods, systems, and computer program products described herein.

Figure 2:
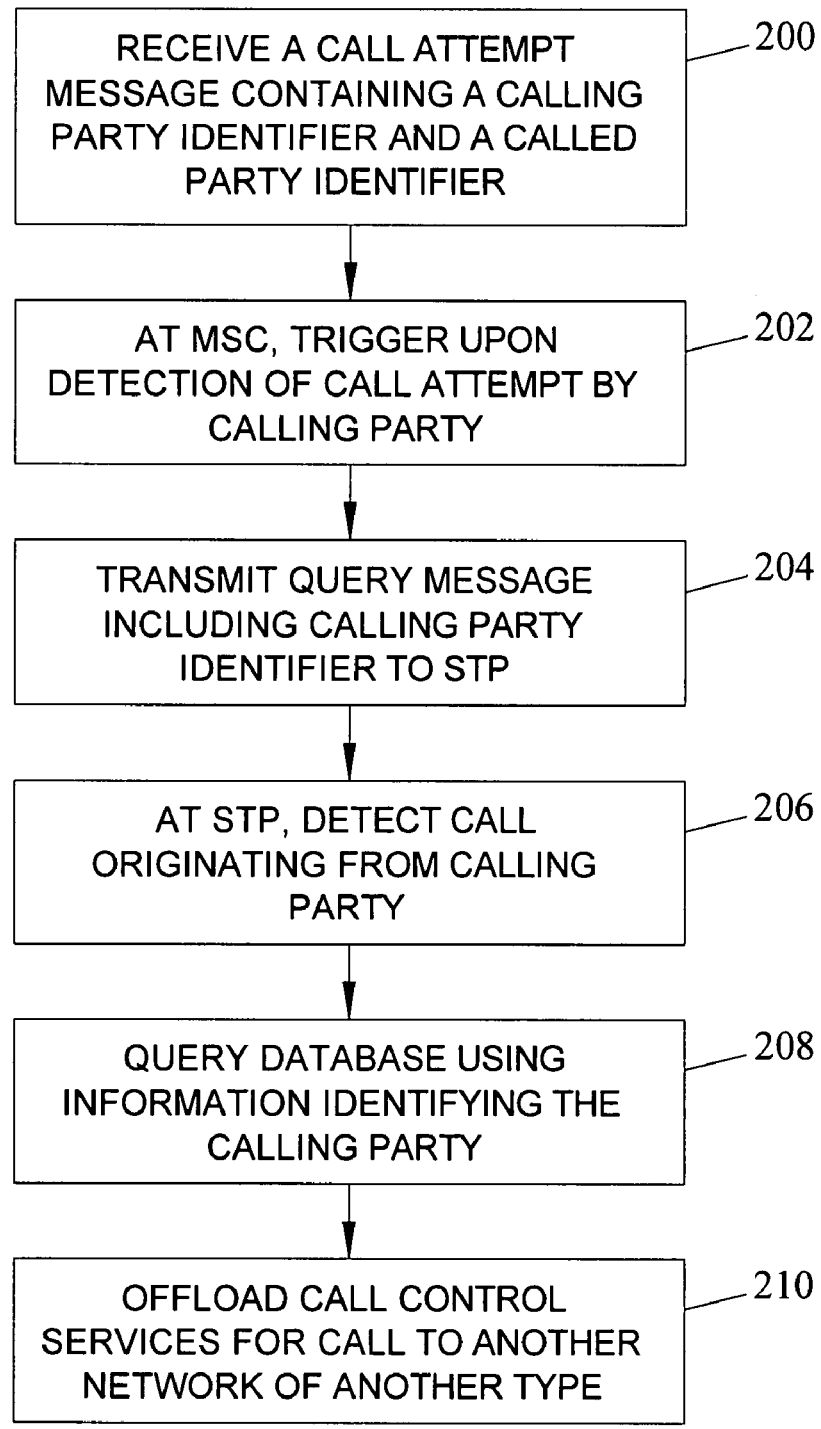
FIG. 2 is a flow chart of an exemplary process of using an originating party query to offload call control services from a GSM network to an IMS network shown in FIG. 1 according to an embodiment of the subject matter described herein.

FIG. 2 is a flow chart illustrating an exemplary process of using an originating party query to offload call control services from GSM network 100 to IMS network 102 shown in FIG. 1 according to an embodiment of the subject matter described herein. Referring to FIGS. 1 and 2, a call attempt may be initiated when a user of mobile subscriber device 104 dials a phone number. A call attempt message 117 may be generated based on the dialed phone number. Message 117 may be communicated to MSC 108 via a base station subsystem (BSS) 118. Message 117 may include a calling party identifier corresponding to calling mobile subscriber device 104 and a called party identifier corresponding to the dialed phone number. The calling party identifier may be the mobile station integrated services digital network (MSISDN) number and/or the international mobile subscriber identifier (IMSI) of mobile subscriber device 104. In this example, the calling party identifier of mobile subscriber device 104 is MSISDN number 919-460-5500 and/or IMSI 310150123456789. The called party identifier may be any suitable destination number, such as an MSISDN of another phone. At block 200, MSC 108 may receive call attempt message 117.

At MSC 108, an IDP trigger may trigger upon detection of the call attempt by calling mobile subscriber device 104 (block 202). In particular, the IDP trigger of MSC 108 may trigger upon receipt of call attempt message 117 containing the calling party identifier of subscriber device 104. In response to triggering, MSC 108 may generate a TCAP InfoAnalyzed query message 120 indicating triggering and detection of a call attempt by calling mobile subscriber device 104. Query message 120 may be transmitted to STP 112 (block 204).

At STP 112, CCO function 114 detects the call originating from mobile subscriber device 104 based upon query message 120 (block 206). In response to receiving query message 120 that indicates a call originating in GSM network 100, CCO function 114 determines an LRN associated with the calling party identifier of mobile subscriber device 104. In particular, function 114 queries CCO database 116 using information identifying the calling party (block 208). For example, function 114 uses the calling party IMSI in query message 120 to perform a lookup in database 116 for a call control offload LRN associated with the calling party IMSI.

Table 1 below shows exemplary entries in a database for associating a subscriber ID with a call control offload LRN.

TABLE 1

Exemplary Entries for Associating a Subscriber ID with a Call Control LRN

| Subscriber ID (CgPN: MSISDN/IMSI) | Call Control Offload LRN (LRN of I-CSCF) |
|---|---|
| 310150123456789 | LRN x |
| 310150123457789 | LRN y |

The entries shown in Table 1 may be stored, for example, in database 116. Database 116 may be provisioned with call control offload LRNs for subscribers who are registered with IMS network 102 and are therefore eligible to receive call control services from IMS network 102. Function 114 may use a subscriber identifier in a TCAP query message to perform a lookup in the table for determining whether a subscriber identifier is associated with the call control offload LRN. In one example, if the subscriber identifier 310150123456789 is contained in a TCAP InfoAnalyzed query, function 114 may generate a TCAP AnalyzeRoute response message containing LRN x. In another example, if the subscriber identifier 310150123457789 is contained in a TCAP InfoAnalyzed query, function 114 may generate a TCAP AnalyzeRoute response message containing LRN y. LRN identifiers may include, but are not limited to, an E.164 formatted network entity address identifier, an SS7 point code address, an Internet protocol (IP) address, or a uniform resource identifier (URI).

Returning to the example of STP 114 receiving message 120, calling party IMSI 310150123456789 is contained in message 120. Function 114 receives the IMSI and queries database 116 using the IMSI. In block 210, function 114 obtains in response to the query, routing information for a node in IMS network 102. In particular, function 114 performs a lookup in database 116 using the calling party IMSI to obtain an LRN for I-CSCF node 130. If an entry including the calling party IMSI is found, function 114 generates a TCAP AnalyzeRoute response message 124 containing the LRN in the entry. STP 112 may forward message 124 to MSC 108 for offloading call control services for the call to I-CSCF node 130 of IMS network 102 (block 210).

In this example of offloading the call control services to I-CSCF node 130, MSC 108 generates an ISUP IAM 126 containing LRN x as the called party number, the original called party number as the GAP parameter, an FCI_PNTI parameter set to TRANSLATED, and the MSISDN of mobile subscriber device 104 as the calling party number. ISUP IAM 126 is generated in response to receiving response message 124 and serves to offload call control services for the call to IMS network 102. ISUP IAM 126 is transmitted to a media gateway controller (MGC) 128. In response to receiving ISUP IAM 126, MGC 128 generates and transmits a SIP INVITE message 132 to an interrogating-call session control function (I-CSCF) node 130. Message 132 contains the original called party number as to the To parameter and the MSISDN of calling mobile subscriber device 104 as the From parameter. Further, MGC 128 uses LRN x to determine the RequestURI parameter address of SIP INVITE message 132. In one embodiment, the RequestURI address may include some or all of the LRN x value. In other embodiments, the RequestURI address may be determined by using the LRN x value to access an LRN-to-IMS node address mapping table or database. In this manner the LRN x value may be translated into a routable IMS network address. I-CSCF node 130 manages registration, routing and forwarding of SIP messages and charging. I-CSCF node 130 queries HSS 134 to determine the location of the S-CSCF 130 serving the calling party. In this case, S-CSCF 110 is assumed to be serving the calling party. Accordingly, I-CSCF node 130 sends a SIP INVITE message 133, which includes the same or similar content as message 132, to S-CSCF 110. In response to receiving message 132, S-CSCF node 110 assumes management of call control services for the call.

An application server (AS) 136 may host and execute services, and interface with the S-CSCF function using SIP. In particular, for example, AS 136 may host and execute services for the call originating from mobile subscriber device 104. AS 136 may be used as a platform for deploying various services in IMS network 102 and can provide SIP functionality, 3GPP AS call control, presence information, ENUM service, prepaid service, voice mail service and other services through the use of application programming interfaces (APIs). Further, AS 136 can operate in SIP proxy mode, SIP UA (user agent) mode or SIP B2BUA back-to-back user agent) mode.

Figure 3:
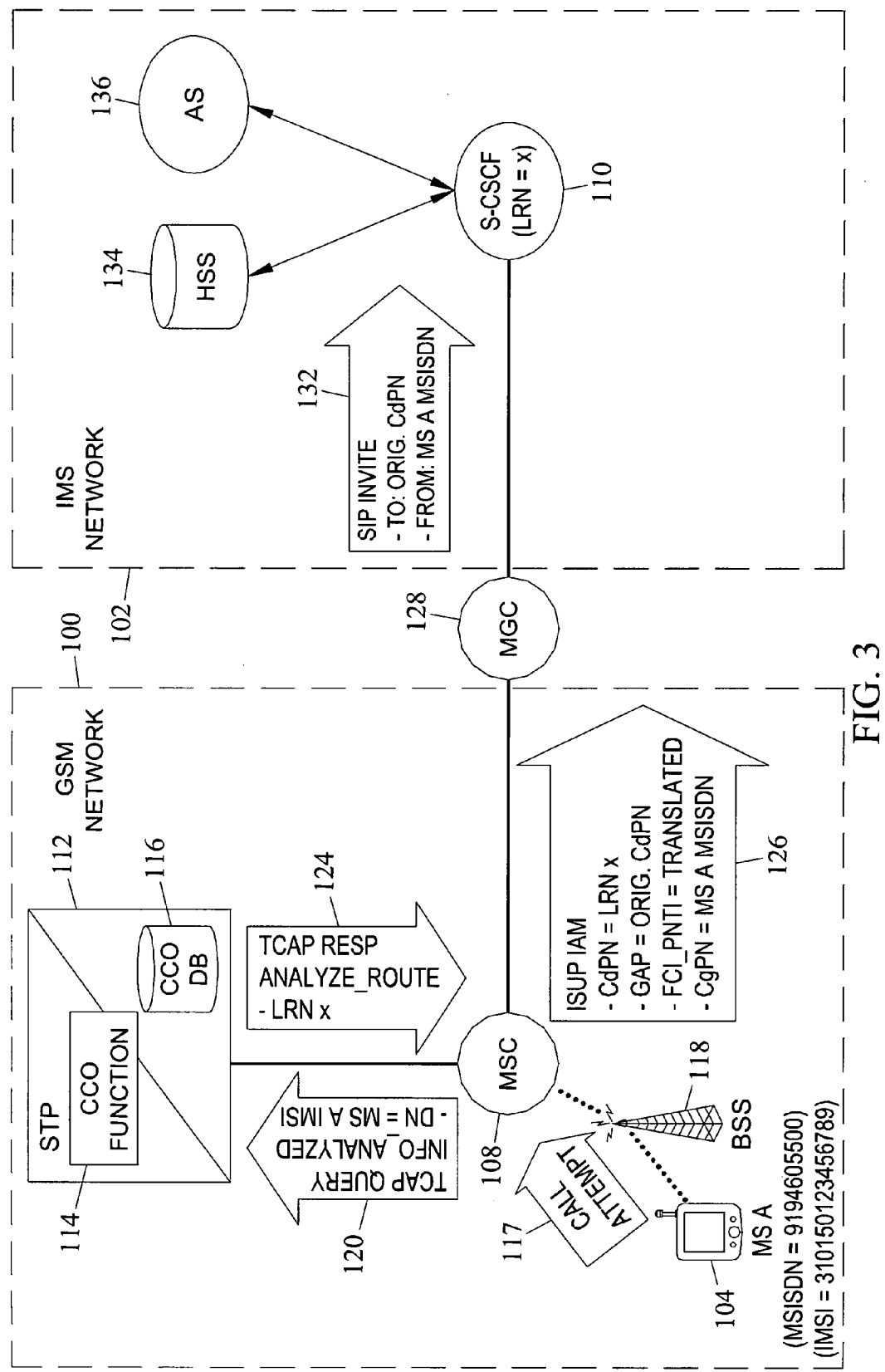
FIG. 3 is a network diagram of another exemplary system for using an originating party query to offload call control services from a GSM network to an IMS network according to an embodiment of the subject matter described herein.

In FIG. 2, the LRN used to offload call control services to the IMS network was the LRN of an I-CSCF. In an alternate implementation of the subject matter described herein, the LRN may correspond to the S-CSCF with which mobile subscriber device 104 is registered. FIG. 3 is a network diagram illustrating such an embodiment. Referring to FIG. 3, a call attempt may be initiated when a user of mobile subscriber device 104 dials a phone number. In response to initiation of the call, call attempt message 117 may be transmitted to MSC 108 where an IDP trigger is triggered upon detection of the call attempt. In response to the triggering, MSC 108 generates and communicates TCAP InfoAnalyzed query message 120 to STP 112.

At STP 112, CCO function 114 receives query message 120. In response to receiving query message 120, CCO function 114 determines whether an LRN associated with the calling party identifier of mobile subscriber device 104 exists in database 116. In particular, function 114 uses the calling party IMSI in query message 120 to perform a lookup in database 116 for a call control offload LRN associated with the calling party IMSI. The LRN may identify a node in IMS network 102 for the offload of call control services for the call.

In one implementation, database 116 may include a range-based data structure and an exception-based data structure. Tables 2 and 3 shown below illustrate examples of a range-based data structure and an exception-based data structure that may be used to implement database 116 according to an embodiment of the subject matter described herein.

TABLE 2

Exemplary Entries for Associating a Subscriber
ID with a Call Control LRN

| Subscriber ID Range Start (CgPN: MSISDN/IMSI) | Subscriber ID Range End (CgPN: MSISDN/IMSI) | Call Control Offload LRN (LRN of S-CSCF) |
| --- | --- | --- |
| 310150123456000 | 310150123456999 | LRN y |
| 310150123457000 | 310150123457999 | LRN x |

TABLE 3

Exemplary Exception Entries for Associating
a Subscriber ID with a Call Control LRN

| Subscriber ID Range (CgPN: MSISDN/IMSI) | Call Control Offload LRN (LRN of S-CSCF) |
| --- | --- |
| 310150123456789 | LRN x |
| 310150123457254 | LRN y |

The entries shown in Tables 2 and 3 may be stored, for example, in database 116. Function 114 may use a subscriber identifier in a received query message to first perform a lookup in Table 3 (the exception-based data structure) for determining whether an LRN is associated with the identifier. If the lookup in the exception-based data structure fails to locate a matching entry, a lookup may then be performed in Table 2 (the range-based data structure). If an entry for the subscriber identifier including the LRN is found in either lookup, it may be determined that the subscriber identifier is associated with an LRN, and therefore is eligible for call control offload services. In one example, if the calling party number 310150123456123 is contained in a TCAP query message, exceptions-based lookup will not result in a match, and function 114 will insert LRN y into the TCAP response message. Function 114 will then forward to the TCAP response message to MSC 108. In another example, if the called party number 310150123457123 is contained in a TCAP query message, exceptions-based lookup will not result in a match, and function 114 will insert LRN x into the TCAP response message. Function 114 will then forward to the TCAP response message to MSC 108.

As described above, Table 3 includes exceptions to the ranges of numbers provided in the entries of Table 2. In one example, an exception may be a number that is within the range but that has a different LRN or routing rule. For example, the first entry in Table 3 corresponds to subscriber identifier 310150123456789. This number is within the range of 310150123456000-310150123456999 that corresponds to the first entry in Table 2. However, the entries have different LRNs. Thus, an exception-based table, such as that illustrated in Table 3, may be used to flexibly allocate different routing instruction for numbers that are assigned to the associated subscribers. If a received calling party number matches the calling party number in an entry of Table 3, the LRN in the entry of Table 3 is used for insertion into the TCAP response message. For example, if the received calling party number is 310150123456789, the exception-based lookup results in a match, the range-based lookup is bypassed, and LRN x is used for insertion into the response message. In another example, if the received calling party number is 310150123457254, the exception-based lookup results in a match, the range-based lookup is bypassed, and LRN y is used for insertion into the response message.

An LRN obtained from Table 2 or Table 3 of database 116 may be inserted in TCAP AnalyzeRoute response message 124. STP 112 may forward message 124 to MSC 108 for offloading call control services for the call to IMS network 102. In this example of offloading call control services for the call, MSC 108 generates an ISUP IAM 126 directed to S-CSCF 110 of IMS network 102, which is associated with LRN x. ISUP IAM 126 is generated in response to receiving response message 124. ISUP IAM 126 contains routing number LRN x, the called phone number, and the calling party number. ISUP IAM 126 is transmitted to a media gateway controller (MGC) 128. In response to receiving ISUP IAM 126, MGC 128 generates and transmits to S-CSCF node 110 a SIP INVITE message 132 containing the called party number and the calling party number. SIP INVITE message 132 is transmitted to S-CSCF node 110. In response to receiving message 132, S-CSCF node 110 assumes management of call control services for the call.

As a result of an exception-based implementation, flexible assignment of 2G subscribers to S-CSCF elements or other IMS network elements can be accomplished. Another advantage of an exception-based implementation is that signaling messages may be routed directly to the appropriate S-CSCF node or another IMS network element in the IMS network without requiring involvement of an I-CSCF node.

Any suitable routing node (e.g., an STP and signaling gateway), call processing node (e.g., media gateway controller, softswitch, gateway tandem office, gateway MSC, TDM-to-Packet gateway), or stand-alone processing platform (e.g., service control point, application server) may include a CCO function in accordance with the subject matter described herein. For example, a CCO function may be included in an SS7/IP-capable STP routing node or a signaling gateway (SG) routing node. In one example, a suitable system for using an originating party query to offload call control services from a first network of a first type to a second network of a second type according to the subject matter described herein may include an EAGLE STP® or an IP$^7$ SECURE GATEWAY® (both commercially available from Tekelec of Morrisville, N.C.).

Figure 4:
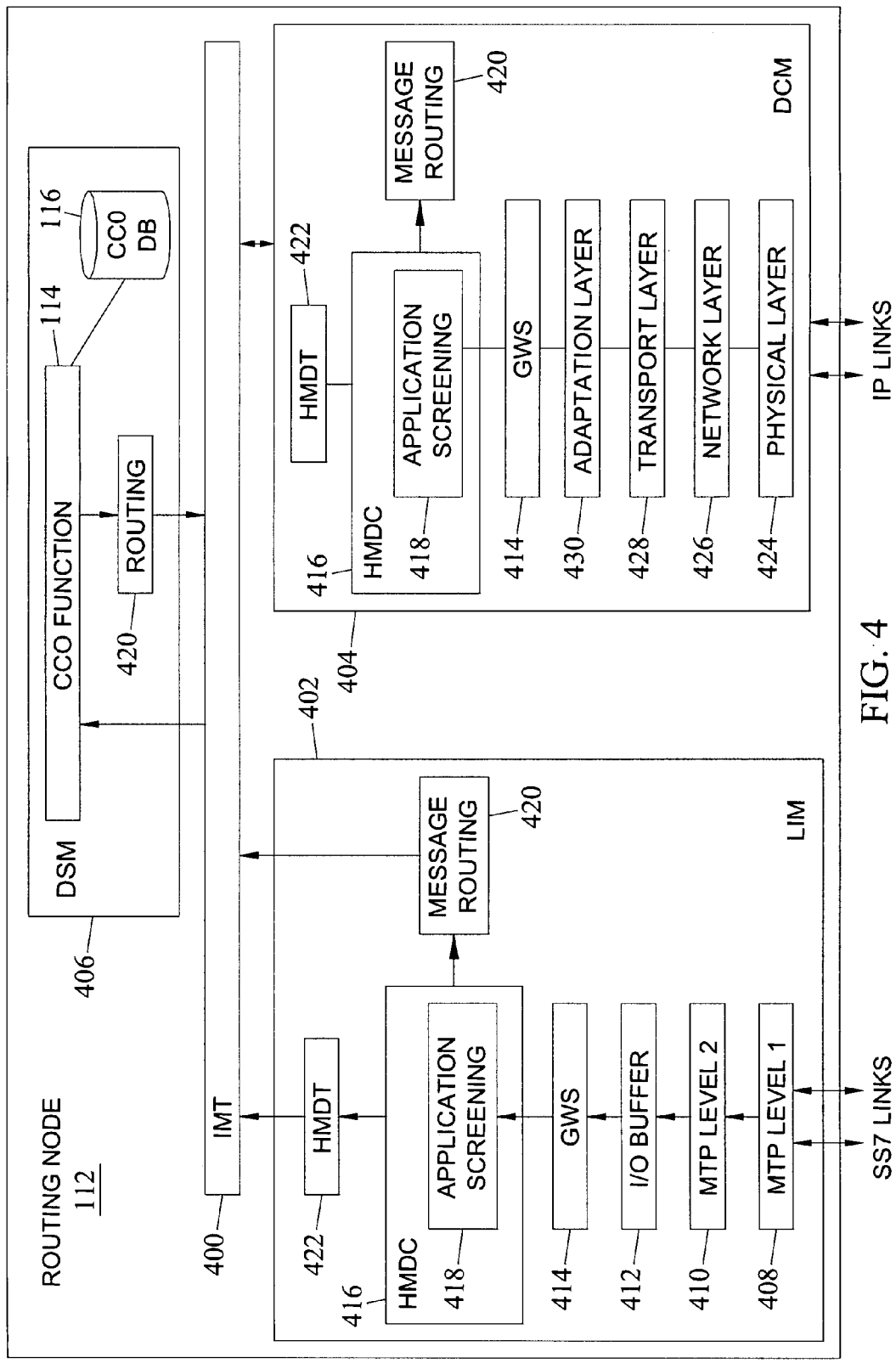
FIG. 4 is a block diagram of an exemplary network routing node including a call control offload (CCO) function according to an embodiment of the subject matter described herein.

FIG. 4 is a block diagram illustrating an exemplary network routing node 112 (e.g., an STP routing node with SSP/IP gateway functionality) including a CCO function according to an embodiment of the subject matter described herein. Referring to FIG. 4, routing node 112 includes an interprocessor message transport (IMT) bus 400 that is the main communication bus among internal subsystems within routing node 112. In one embodiment, this high-speed communications system includes two counter-rotating serial rings. A number of processing modules or cards may be coupled to IMT bus 400. In FIG. 4, IMT bus 400 may be coupled to a link interface module (LIM) 402, a data communications module (DCM) 404, and a database service module (DSM) 406, which includes CCO function 114 and CCO database 116. These modules are physically connected to IMT bus 400 such that signaling and other types of messages may be routed internally between active cards or modules. For simplicity of illustration, only a single LIM, a single DCM, and a single DSM card are included in FIG. 4. However, routing node 112 may include multiple other LIMs, DCMs, DSMs, and other cards, all of which may be simultaneously connected to and communicating via IMT bus 400.

Each module 402, 404, and 406 may include an application processor and a communication processor. The communication processor may control communication with other modules via IMT bus 400. The application processor on each module may execute the applications or functions that reside on each module. For example, the application processor on DSM 406 may execute software that implements CCO function 114. Similarly, the application processor on LIM 402 may execute software that implements a screening function for determining whether messages should be forwarded to DSM 406 for application to a CCO function.

LIM 402 may include an SS7 MTP level 1 function 408, an SS7 MTP level 2 function 410, an I/O buffer 412, a gateway screening (GWS) function 414, an SS7 MTP level 3 message handling and discrimination (HMDC) function 416, including an application screening function 418, a message routing function 420, and a message handling and distribution (HMDT) function 422. MTP level 1 function 408 sends and receives digital data over a particular physical interface. MTP level 2 function 410 provides error detection, error correction, and sequenced delivery of SS7 message packets. I/O buffer 412 provides temporary buffering of incoming and outgoing signaling messages.

GWS function 414 examines received message packets and determines whether the message packets should be allowed in routing node 112 for processing and/or routing. HMDC function 416 performs discrimination operations, which may include determining whether the received message packet requires processing by an internal processing subsystem or is simply to be through switched (i.e., routed on to another node in the network). Messages that are permitted to enter routing node 112 may be routed to other communications modules in the system or distributed to an application engine or processing module via IMT bus 400. Routing function 420 may route received messages that are identified by HMDC function 416 as requiring routing to the appropriate LIM associated with the message destination. Exemplary routing criteria that may be used by routing function 420 to route messages include destination point code (DPC), origination point code (OPC), circuit identifier code (CIC), service indicator (SI), inbound linkset, or any combination thereof. HMDT function 422 distributes messages identified by HMDC function 416 as requiring further processing to the appropriate processing module within routing node 112 for providing the processing.

Application screening function 418 may examine received message packets and determine whether the message packets should be forwarded to DSM 406 for application to CCO function 114. For example, application screening function 418 may determine whether a received message packet is a TCAP InfoAnalyzed query message. In another example, application screening function 418 may be omitted, and HMDC function 416 may forward all messages addressed to the point code of routing node 112 to DSM 406 for further processing. If it is determined that the received message should be forwarded to DSM 406, the message is forwarded to DSM 406 for processing by CCO function 114. If it is determined that the received message should not be forwarded to DSM 406, the message will be routed by routing node 112 without being processed by CCO function 114. For example, HMDC function 416 may forward messages that are not addressed to the point code of routing node 112 to routing function 420, and routing function 420 may route such messages to the LIM of DCM associated with the outbound signaling link.

DCM 404 includes functionality for sending and receiving SS7 messages over IP signaling links. In the illustrated example, DCM 404 includes a physical layer function 424, a network layer function 426, a transport layer function 428, an adaptation layer function 430, and functions 414, 416, 418, 420, and 422, described above with regard to LIM 402. Physical layer function 424 performs open systems interconnect (OSI) physical layer operations, such as transmitting messages over an underlying electrical or optical interface. In one example, physical layer function 424 may be implemented using Ethernet. Network layer function 426 performs operations, such as routing messages to other network nodes. In one implementation, network layer function 426 may implement Internet protocol. Transport layer function 428 implements OSI transport layer operations, such as providing connection oriented transport between network nodes, providing connectionless transport between network nodes, or providing stream oriented transport between network nodes. Transport layer function 426 may be implemented using any suitable transport layer protocol, such as stream control transmission protocol (SCTP), transmission control protocol (TCP), or user datagram protocol (UDP). Adaptation layer function 430 performs operations for sending and receiving SS7 messages over IP transport. Adaptation layer function 430 may be implemented using any suitable IETF or other adaptation layer protocol. Examples of suitable protocols include MTP level 2 user peer-to-peer adaptation layer (M2PA), MTP level 3 user adaptation layer (M3UA), and/or signaling connection control part (SCCO) user adaptation layer (SUA). Functions 414, 416, 418, 420, and 422 perform the same operations as the corresponding components described above with regard to LIM 402.

DSM 406 receives messages identified as requiring to CCO function 114. In one embodiment, function 114 determines a call control offload LRN associated with the calling party number in a received TCAP InfoAnalyzed query message. In particular, function 114 may use the calling party number in the received message to perform a lookup in database 114 for a call control LRN associated with the calling party number. The call control LRN associated with the calling party number in the received message is inserted into a TCAP response message associated with the received message. After insertion of the call control offload LRN, the message can be forwarded to a routing function 420 for routing to LIM 402 via IMT bus 400. If no call control offload LRN is found that is associated with the calling party number, then no LRN is inserted in the response message. LIM 402 may then forward the response message to the MSC that originated the query message.

Figure 5:
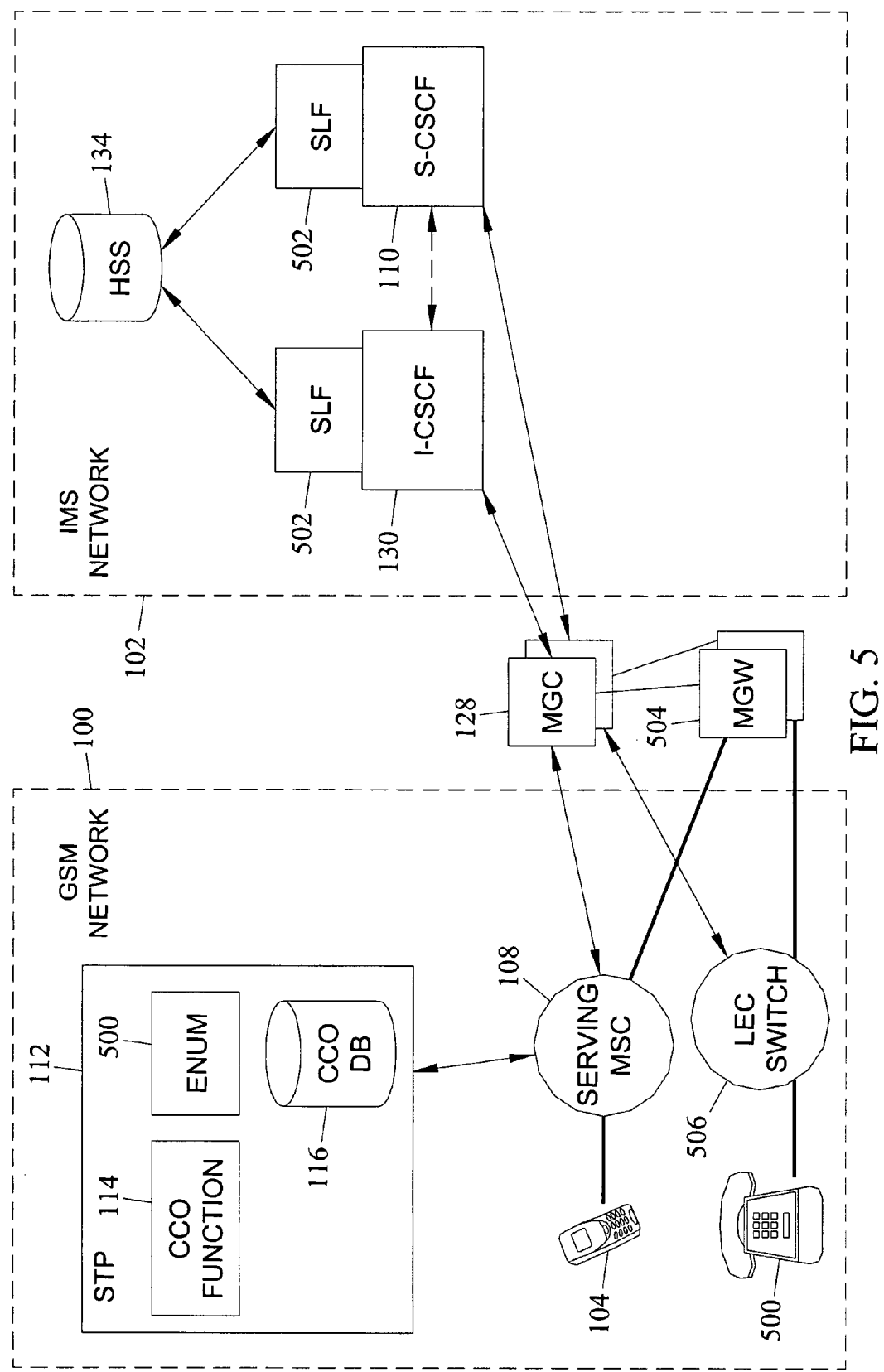
FIG. 5 is a network diagram of an exemplary system for using an originating party query to offload call control services from a GSM network to an IMS network according to an embodiment of the subject matter described herein.

Offloading call control to another network may include routing at least a portion of the call over an alternate and possibly less expensive media path. FIG. 5 is a network diagram illustrating the same components illustrated in FIGS. 1 and 3 for offloading call control and also illustrating media path components for routing at least a portion of the media path over an alternate network. Referring to FIG. 5, a call attempt may be initiated when a user of mobile subscriber device 104 dials a phone number of PSTN phone 500. In response to initiation of the call, a call attempt message may be transmitted to a serving MSC 108 where an IDP trigger is triggered upon detection of the call attempt. MSC 108 may generate and communicate a TCAP InfoAnalyzed query message to STP 112, which includes CCO function 114, COO database 116, and may also include an ENUM database 500 for translating E.164-formatted numbers to URIs. The query message includes the calling party number of mobile subscriber device 104.

At STP 112, CCO function 114 detects the call originating from mobile subscriber device 104 based upon the received query message. In response to receiving the query message, CCO function 114 determines a call control offload routing number associated with the identifier of mobile subscriber device 104. In particular, function 114 may use a calling party IMSI in the query message to perform a lookup in CCO database 116 for a routing number associated with the calling party IMSI. The routing number obtained from database 116 based on the lookup may be inserted in a TCAP AnalyzeRoute response message. STP 112 may forward the response message to MSC 108 for offloading call control services for the call to IMS network 102.

In this example of offloading call control services for the call, MSC 108 generates an ISUP IAM containing the routing number corresponding to a node in the IMS network. The ISUP IAM is generated in response to receiving the TCAP AnalyzeRoute response message. In one example, the ISUP IAM contains the routing number, the called phone number, and the calling party number. Further, the ISUP IAM is transmitted to MGC 128. In response to receiving the ISUP IAM, MGC 128 generates and transmits to I-CSCF node 130 a SIP INVITE message containing the original called party number and the calling party number. In response to receiving the SIP INVITE message, I-CSCF node 130 and its associated service location function (SLF) queries HSS 134 to determine the S-CSCF serving the subscriber. In this example, S-CSCF 110 is identified. S-CSCF 110 directs MGC 128 to establish a media trunk between MGW 504 and terminating end office switch 506 and another media trunk between serving MSC 108 and media gateway 504 by sending a SIP INVITE message to MGC 128. In response to the INVITE message, MGC 128 instructs MGW 504 to create the appropriate media connections. Thus, in the example illustrated in FIG. 5, call control services are offloaded to the IMS network, and the IMS network routes a call with a 2G wireless origination and a PSTN termination over IP media trunks.

Figure 6:
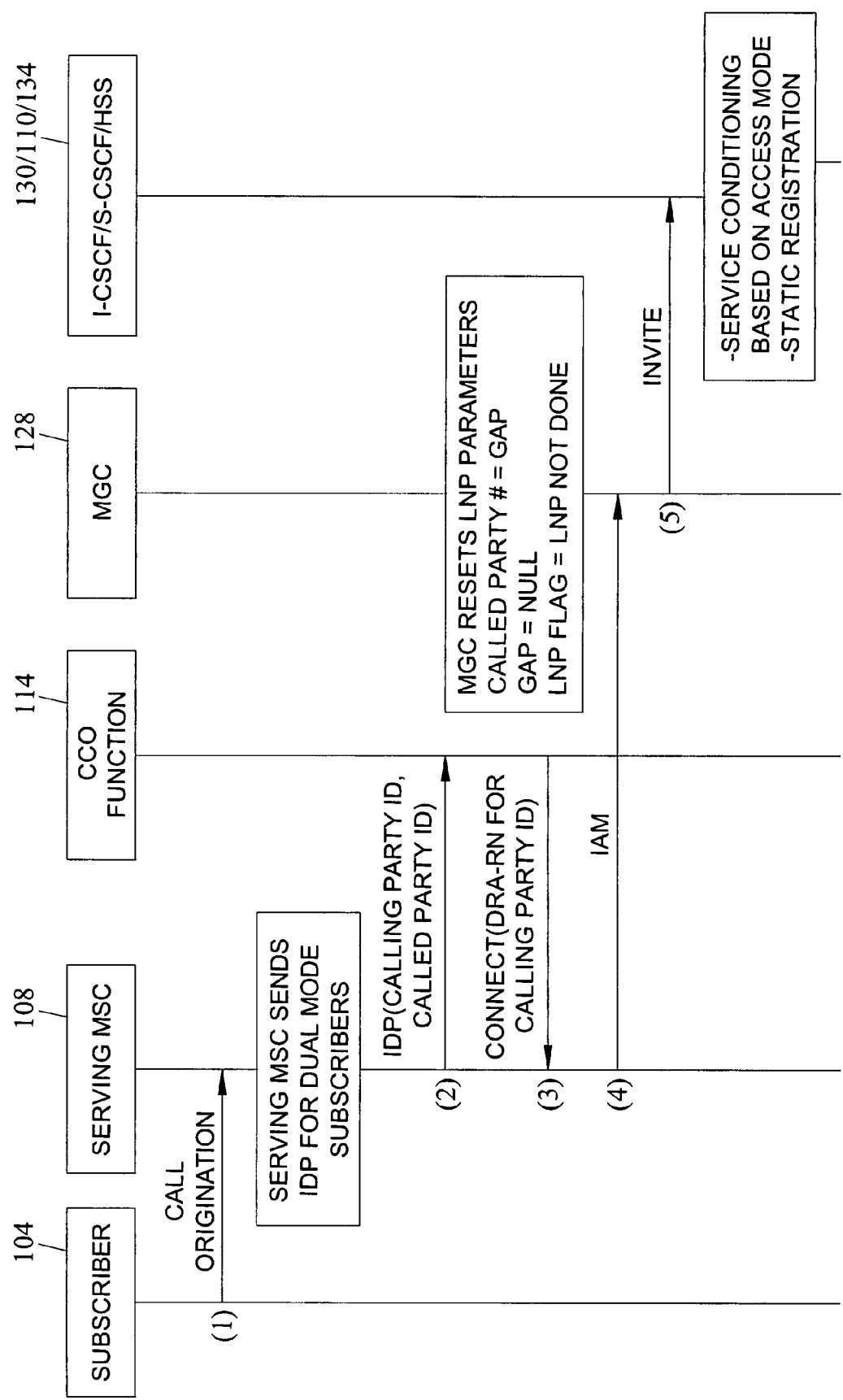
FIG. 6 is a message flow diagram of an exemplary exchange of messages among a mobile subscriber, a serving mobile switching center (MSC), a CCO function, an MGC, and IMS network components for using an originating party query to offload call control services from a GSM network to an IMS network according to the subject matter described herein.

As an alternate method for illustrating call control offload functionality according to an embodiment of the subject matter described herein, FIG. 6 is a message flow diagram of an exemplary exchange of messages among mobile subscriber device 104, serving MSC 108, CCO function 112, MGC 128, and the IMS network components 110, 130, and 134. In this example, a calling party inputs information into mobile subscriber device 104 for calling a called party. Initially, in step 1, call origination is detected by MSC 108, which causes an IDP trigger to be activated. In response to triggering, in step 2, MSC 108 transmits to CCO function 114 a TCAP AnalyzeRoute query message including an identifier for calling mobile subscriber device 104 and an identifier for the called party.

CCO function 114 determines a routing number associated with the calling party identifier. In step 3, function 114 transmits to MSC 108 a TCAP AnalyzeRoute response message including the routing number. In step 4, MSC 108 transmits to MGC 128 an ISUP IAM message contains the routing number, the called phone number, and the calling party number. In step 5, MGC 128 transmits to one of IMS network components 130, 110, and 134 a SIP INVITE message containing the called party number and the calling party number for offloading call control services to the IMS network.

Figure 7:
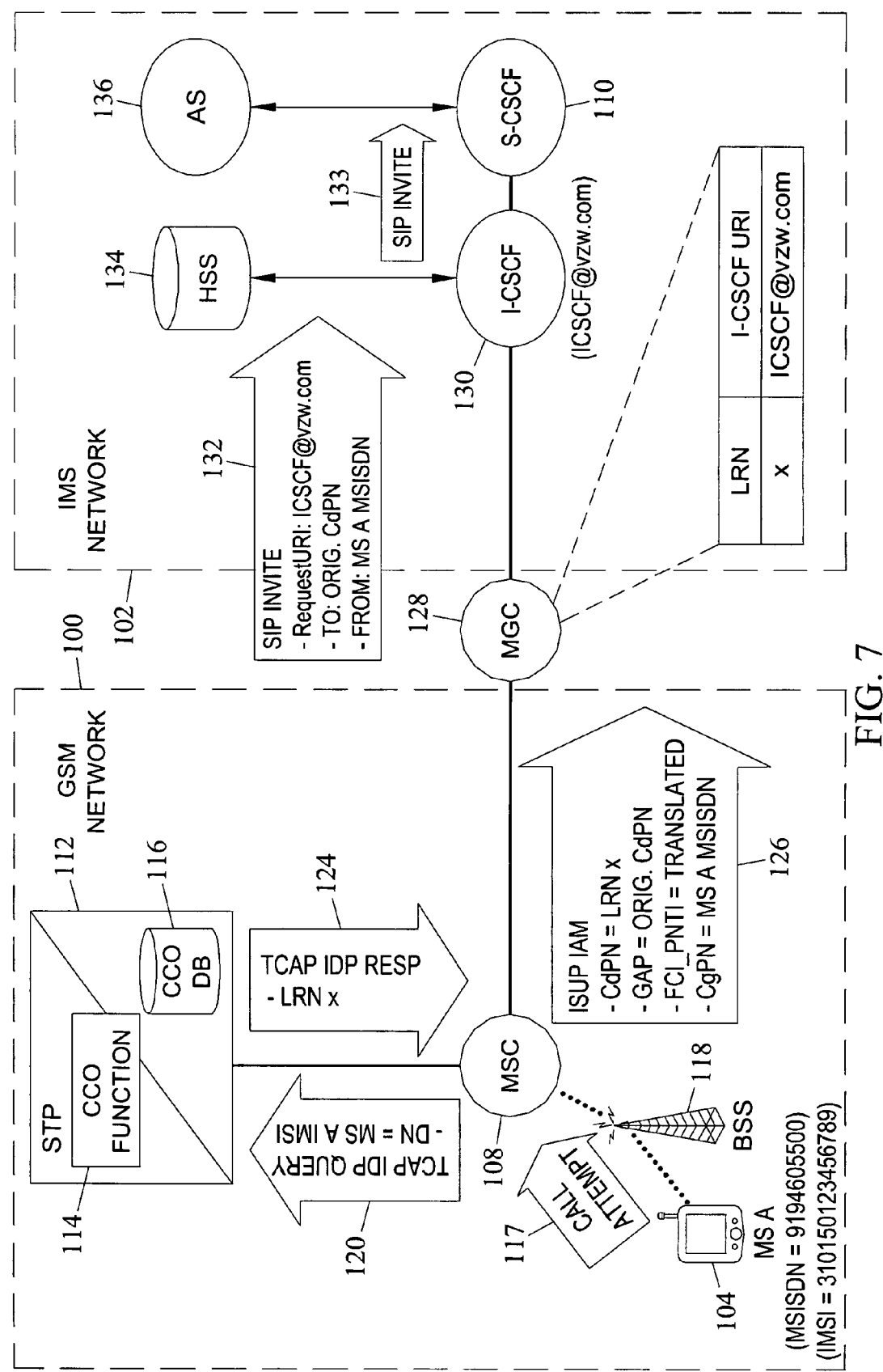
FIG. 7 is a network diagram of another exemplary system for using an originating party query to offload call control services from a GSM network to an IMS network according to an embodiment of the subject matter described herein.

In an alternate implementation of the subject matter described herein, MGC 128 may maintain a database for mapping the LRN to an I-CSCF node. FIG. 7 is a network diagram illustrating such an embodiment. Referring to FIG. 7, a call attempt may be initiated when a user of calling mobile subscriber device 104 dials a phone number. In response to initiation of the call, call attempt message 117 may be transmitted to MSC 108 where an IDP trigger is triggered upon detection of the call attempt. In response to the triggering, MSC 108 generates and communicates TCAP InfoAnalyzed query message 120 to STP 112.

At STP 112, CCO function 114 receives query message 120. In response to receiving query message 120, CCO function 114 determines whether an LRN associated with the identifier of calling mobile subscriber device 104 exists in database 116. In particular, function 114 uses the calling party IMSI in query message 120 to perform a lookup in database 116 for a call control offload LRN associated with the calling party IMSI. The LRN may identify a node in IMS network 102 for the offload of call control services for the call.

An LRN obtained from database 116 may be inserted in TCAP AnalyzeRoute response message 124. STP 112 may forward message 124 to MSC 108 for offloading call control services for the call to IMS network 102. In this example of offloading call control services for the call, MSC 108 generates an ISUP IAM 126 directed to I-CSCF 130, which is associated with LRN x. ISUP IAM 126 is generated in response to receiving response message 124. ISUP IAM 126 contains routing number LRN x, the called phone number, and the calling party number. ISUP IAM 126 is transmitted to MGC 128. In response to receiving ISUP IAM 126, MGC 128 generates and transmits to I-CSCF node 130 a SIP INVITE message 132 containing the called party number and the calling party number. Further, SIP INVITE message 132 includes a RequestURI set to address ICSCF@vzw.com, which corresponds to I-CSCF 130. MGC 128 maintains a table that maps the LRN to an I-CSCF URI. In this example, LRN x contained in ISUP IAM 126 is mapped to the I-CSCF URI ICSCF@vzw.com. SIP INVITE message 132 is transmitted to I-CSCF 130, which in turn routes SIP INVITE 133 to S-CSCF node 110. In response to receiving message 132, S-CSCF node 110 assumes management of call control services for the call.

Figure 8:
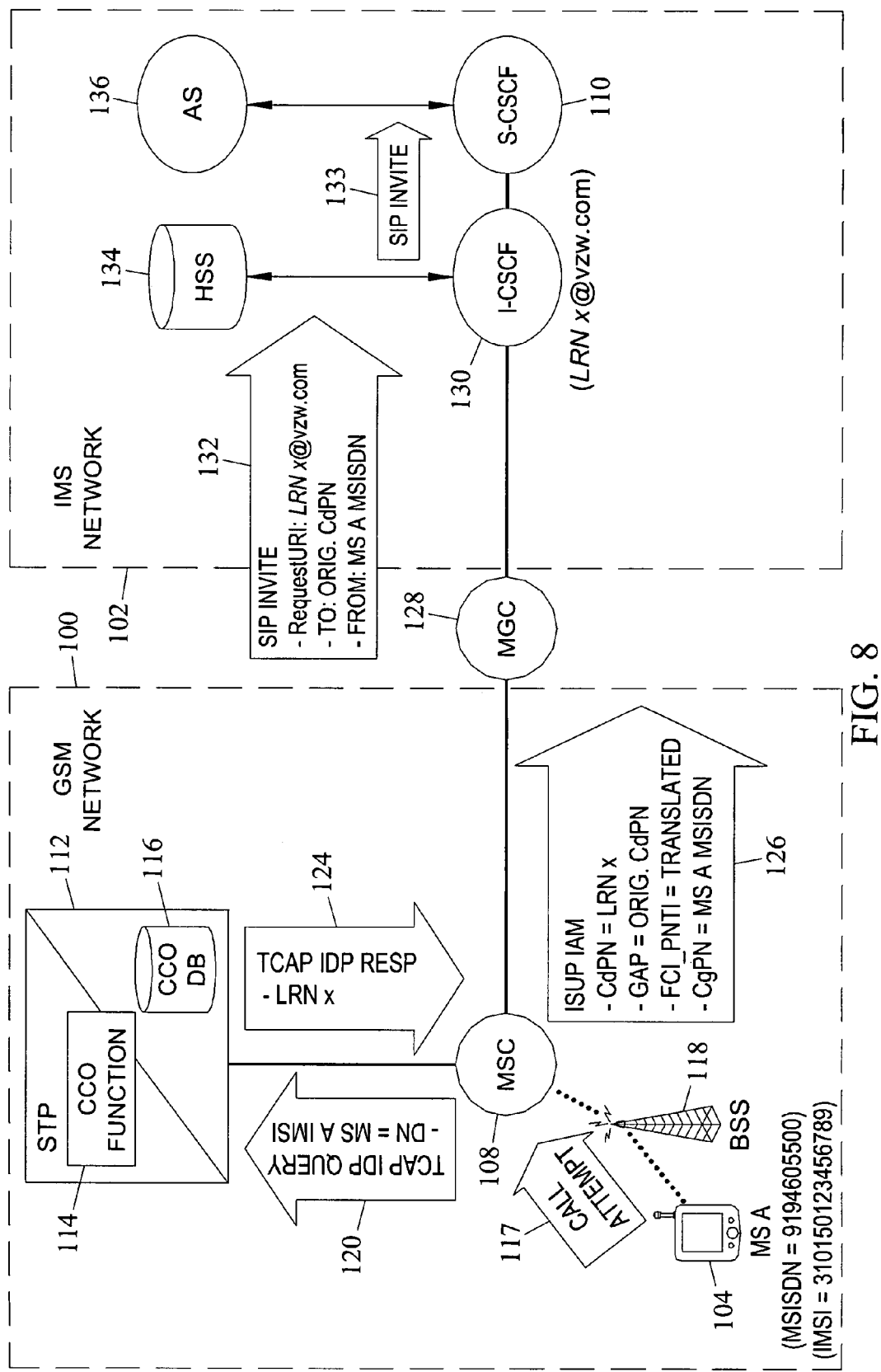
FIG. 8 is a network diagram of yet another exemplary system for using an originating party query to offload call control services from a GSM network to an IMS network according to an embodiment of the subject matter described herein.

In another implementation of the subject matter described herein, MGC 128 may append domain name information to an LRN to generate a routable URI address for routing a SIP INVITE message to an I-CSCF node. FIG. 8 is a network diagram illustrating such an embodiment. Referring to FIG. 8, ISUP IAM 126 containing LRN x is received at MGC 128. In this example, the domain name information "@vzw.com" is appended to "LRNx" to obtain a RequestURI for specifying I-CSCF 130. MGC 128 generates SIP INVITE 132 containing the RequestURI and send SIP INVITE 132 to I-CSCF 130 using the RequestURI.

In another example of appending domain name information to an LRN to generate a routable URI address, the LRN may be a telephone number to which the domain name information is appended. For example, the LRN may be 9195551000. The domain name information may be attached. In one example, LRN 9195551000 can become 9195551000@verizonwirelessCSCF.com when the domain name is appended thereto. This URI may be inserted in the Request URI parameter of the SIP INVITE message generated by the MGC. Next, the SIP INVITE message can be routed to the I-CSCF associated with the Request URI.

Figure 9:
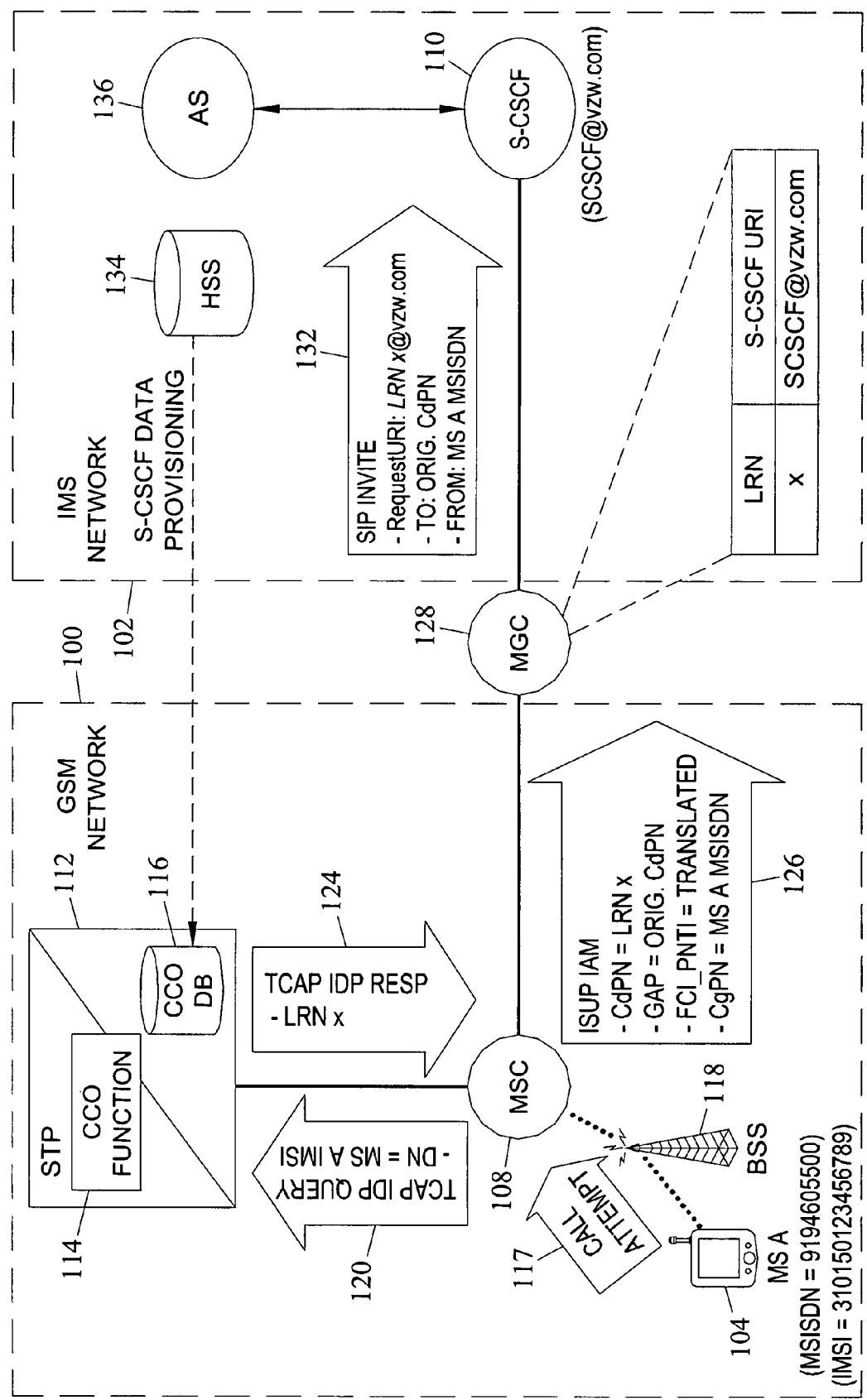
FIG. 9 is a network diagram of yet another exemplary system for using an originating party query to offload call control services from a GSM network to an IMS network according to an embodiment of the subject matter described herein.

In yet another implementation of the subject matter described herein, CCO database 116 is adapted to maintain data which maps a calling party identifier to a routing address (e.g., LRN, entity address, MSC address, etc.), associated with an S-CSCF. FIG. 9 is a network diagram illustrating such an embodiment. In this example, a call attempt is initiated when a user of calling mobile subscriber device 104 dials a phone number. In response to initiation of the call, call attempt message 117 may be transmitted to MSC 108 where an IDP trigger is triggered upon detection of the call attempt. In response to the triggering, MSC 108 generates and communicates TCAP InfoAnalyzed query message 120 to STP 112.

At STP 112, CCO function 114 receives query message 120. In response to receiving query message 120, CCO function 114 determines whether an LRN associated with the identifier of calling mobile subscriber device 104 exists in database 116. In particular, function 114 uses the calling party IMSI in query message 120 to perform a lookup in database 116 for a call control offload LRN associated with the calling party IMSI. In this case, the returned LRN x identifies the S-CSCF node in IMS network 102 to which the calling mobile subscriber is assigned.

The LRN x obtained from database 116 is inserted in TCAP AnalyzeRoute response message 124. STP 112 forwards message 124 to MSC 108 for offloading call control services for the call to IMS network 102. MSC 108 generates an ISUP IAM 126 directed to MGC 128. ISUP IAM 126 is generated in response to receiving response message 124. ISUP IAM 126 contains routing number LRN x, the called phone number, and the calling party number. ISUP IAM 126 is transmitted to MGC 128. In response to receiving ISUP IAM 126, MGC 128 generates and transmits to S-CSCF node 110 a SIP INVITE message 132 containing the called party number and the calling party number. Further, MGC 128 maintains a table that maps the LRN x to an S-CSCF URI. In this example, LRN x contained in ISUP IAM 126 is mapped to the S-CSCF URI SCSCF@vzw.com. SIP INVITE message 132 includes a RequestURI set to address SCSCF@vzw.com, which corresponds to S-CSCF 110. SIP INVITE message 132 is transmitted to S-CSCF 110 using the address specified in the RequestURI. In response to receiving message 132, S-CSCF node 110 assumes management of call control services for the call.

In one embodiment, HSS 134 may be operable to provision database 116 of STP 112 with data that associates calling party numbers with their corresponding S-CSCF nodes. Such data may alternatively be provisioned by any other suitable IMS network administration center. In this manner, the LRN returned by a lookup in database 116 directly identifies the corresponding S-CSCF, thereby allowing the SIP INVITE message to be routed directly to the S-CSCF. Further, in this manner, the I-CSCF may be effectively shielded from traffic, thereby minimizing I-CSCF resource use.

Figure 10:
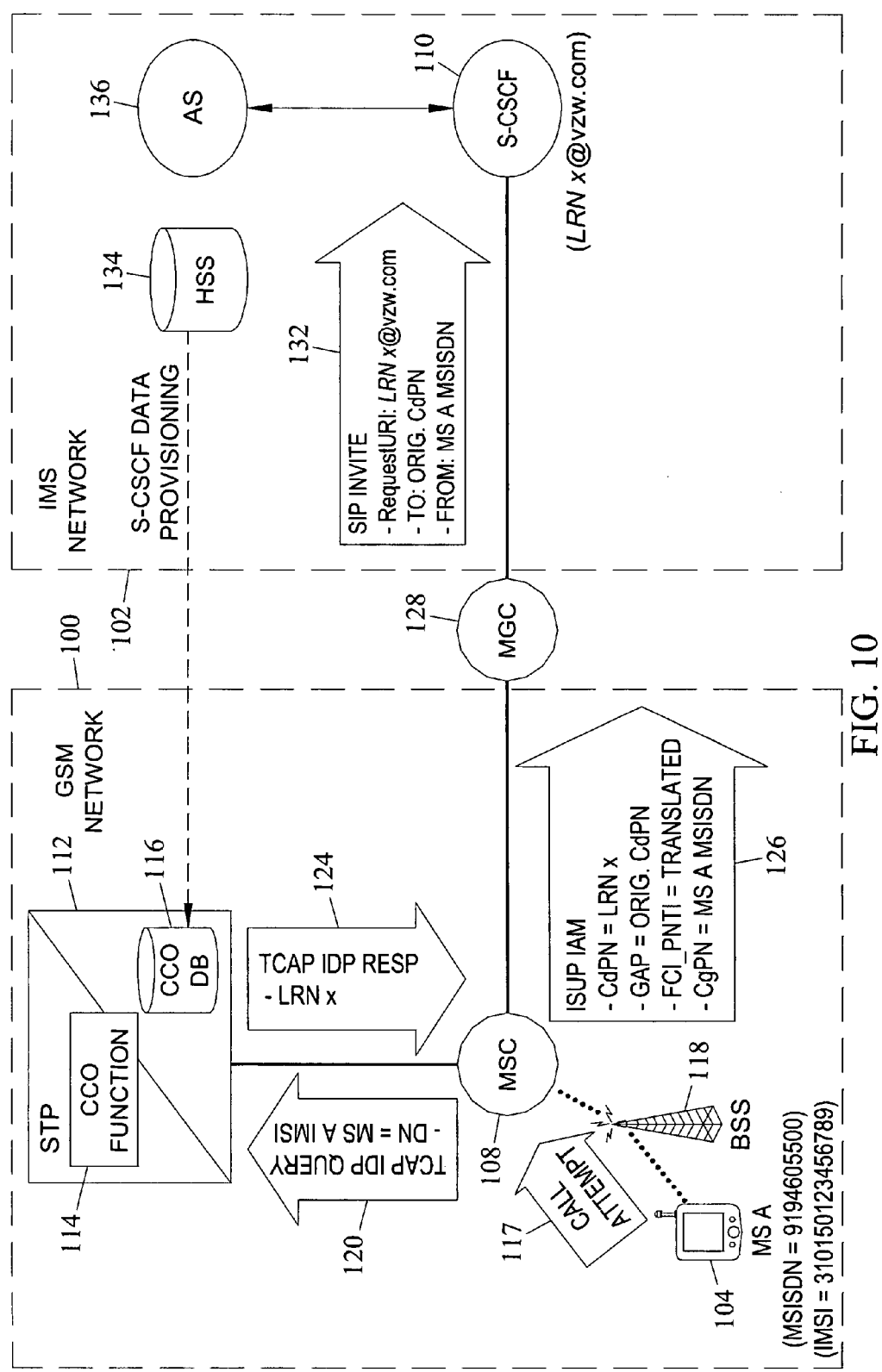
FIG. 10 is a network diagram of another exemplary system for using an originating party query to offload call control services from a GSM network to an IMS network according to an embodiment of the subject matter described herein.

In yet another implementation of the subject matter described herein, MGC 128 may append domain name information to an LRN to generate a routable URI address for routing a SIP INVITE message to the S-CSCF with which mobile subscriber is registered. FIG. 10 is a network diagram illustrating such an embodiment. Referring to FIG. 10, ISUP IAM 126 containing LRN x is received at MGC 128. In this example, the domain name information "@vzw.com" is appended to "LRNx" to obtain a RequestURI for specifying S-CSCF 110, which corresponds to mobile device 104. MGC 128 generates SIP INVITE 132 containing the RequestURI and send SIP INVITE 132 to S-CSCF 110 using the RequestURI.

In yet another embodiment of the present invention, a CCO database may be co-located with or integrated with a number portability database (e.g., mobile number portability database, local number portability database, service provider portability database, and geographic number portability database). The associated CCO function is adapted to access both the number portability data and call control offload data. In one embodiment, the CCO function may receive a query, such as a TCAP query, that contains both called party identifier and calling party identifier information. The CCO function is adapted to use the called party identifier information to perform a number portability lookup in the number portability database, and to use the calling party identifier information to perform a call control offload lookup in the call control offload database. The number portability database lookup using the called party identifier information may yield a number portability LRN value, while the call control offload database lookup using the calling party identifier information may yield a call control offload LRN value. The CCO function may respond to the TCAP query originator with a single response message which includes both the number portability and call control offload LRN values. Alternatively, the CCO function may respond to the query originator with multiple response messages that convey the LRN information.

In an alternate embodiment, the CCO function may receive separate queries for number portability service and call control offload service. In this case, the number portability query includes called party identifier information, while the call control offload query includes calling party identifier information. The CCO function is adapted to use the called party identifier information to perform a number portability lookup in the number portability database, and to use the calling party identifier information to perform a call control offload lookup in the call control offload database. The number portability database lookup using the called party identifier information may yield a number portability LRN value, while the call control offload database lookup using the calling party identifier information may yield a call control offload LRN value. The CCO function may respond to the TCAP query originator with either a single response message which includes both the number portability and call control offload LRN values, or with a separate number portability response message (which includes the number portability LRN value) and a separate call control offload response message (which includes the call control offload LRN value).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for offloading call control services from a first network of a first protocol type to a second network of a second protocol type, the method comprising:
    at a call control offload function implemented at a network routing node:
        receiving a query message in response to a switching office detecting a call originating from a calling party in a first network of a first protocol type;
        in response to receiving the query message:
            determining routing information for a node in a second network of a second protocol type different from the first protocol type based on information identifying the calling party; and
            offloading call control services to the second network using the node, wherein the node in the second network comprises an IP multimedia subsystem (IMS) call session control function (CSCF) that facilitates providing of the call control services using nodes in the second network, wherein offloading the call control services includes providing the routing information to the switching office and so that the switching office can use the routing information to offload the call control services.

2. The method of claim 1 wherein the first network comprises a global system for mobile communications (GSM) and the second network comprises a session initiation protocol (SIP)-based network.

3. The method of claim 1 wherein the first network comprises a 2G wireless network and the second network comprises a SIP-based network.

4. The method of claim 1 wherein detecting a call originating from a calling party includes detecting the call using an initial detection point trigger set in a node of the first network to detect the call originating from the calling party.

5. The method of claim 1 wherein obtaining routing information includes obtaining a routing number of the node in the second network.

6. The method of claim 1 wherein the CSCF communicates with other nodes in the second network using the SIP protocol to facilitate the providing of the call control services by the nodes in the second network.

7. The method of claim 6 wherein the CSCF comprises an interrogating-call session control function (I-CSCF) node.

8. The method of claim 6 wherein the CSCF comprises a serving-call session control function (S-CSCF) node.

9. The method of claim 8 wherein offloading call control services includes offloading call control services for the call to the S-CSCF node.

10. The method of claim 1 comprising, at the node in the second network, selecting a media path for the call, and routing the call over the selected media path.

11. The method of claim 1 comprising determining number portability information based on information identifying a called party associated with the call.

12. The method of claim 11 comprising communicating the number portability information to the node in the second network.

13. The method of claim 11 comprising receiving a TCAP query message including the information identifying the calling party and the information identifying a called party associated with the call.

14. The method of claim 11 comprising receiving a first TCAP query message including the information identifying the calling party and receiving a second TCAP query message including the information identifying a called party associated with the call.

15. The method of claim 1 wherein offloading call control services includes offloading one or more of the call, call forwarding, call waiting, presence service, prepaid service, and voice mail service.

16. A method for providing call control offload information to a requestor, the method comprising:
    at a call control offload function implemented at a network routing node:
        receiving, from switching office and in response to the switching office detecting a call originating from a calling party a first network of a first protocol type, a query requesting call control offload routing information that includes a calling party identifier;
        in response to receiving the query:
            performing a lookup in a call control offload database using the calling party identifier to obtain call control offload routing information used for offloading call control services for the call to a second network of a second protocol type different from the first protocol type and wherein the call offload routing information is usable to identify at least one IP multimedia subsystem (IMS) call session control function (CSCF) that facilitates providing of the call control services using nodes in the second network; and
            returning the call control offload routing information to the switching office so that the switching office can use the routing information to offload the call control services.

17. A system for offloading call control services from a first network of a first protocol type to a second network of a second protocol type, the system comprising:

a network routing node including:

a communications module configured to receive a query message from a switching office in response to the switching office detecting a call originating from a calling party in a first network of a first protocol type; and a call control offload function configured to determine routing information for a node in a second network of a second protocol type different from the first protocol type based on information identifying the calling party and configured to offload call control services to the second network using the node, wherein the node in the second network comprises an IP multimedia subsystem (IMS) call session control function (CSCF) that facilitates providing of the call control services using nodes in the second network and wherein the call control offload function provides the routing information to the switching office so that the switching office can use the routing information to offload the call control services.

18. The system of claim 17 wherein the first network comprises a public switched telephone network (PSTN) and the second network comprises a session initiation protocol (SIP)-based network.

19. The system of claim 17 wherein the first network comprises a 2G wireless network and the second network comprises a SIP-based network.

20. The system of claim 17 wherein the CSCF communicates with other nodes in the second network using SIP to facilitate the providing of the call control services by the nodes in the second network.

21. The system of claim 20 wherein the CSCF comprises an interrogating-call session control function (I-CSCF) node.

22. The system of claim 20 wherein the CSCF comprises a serving-call session control function (S-CSCF) node.

23. The system of claim 17 comprising a routing node, wherein the communication module and the call control offload function are located in the routing node.

24. The system of claim 17 comprising a call control offload database accessible by the call control offload function for locating the routing information.

25. The system of claim 17 wherein the communications module is configured to receive information identifying a called party associated with the call, and wherein the call control offload function is configured to determine number portability information based on the information identifying the called party associated with the call.

26. The system of claim 25 wherein the call control offload function is configured to communicate the number portability information to the node in the second network.

27. The system of claim 25 wherein the query message comprises a TCAP query message including the information identifying the calling party and the information identifying a called party associated with the call.

28. The system of claim 25 wherein the query message comprises a first TCAP query message including the information identifying the calling party, and wherein the communications module is configured to receive a second TCAP query message including the information identifying a called party associated with the call.

29. A system for providing call control offload information to a requester, the system comprising:

a network routing node including a call control offload function and a call control offload database;

the call control offload function being associated with a first network of a first protocol type and configured to:

receive from a switching office a query requesting call control offload routing information that includes a calling party identifier, the query being generated in response to the switching office detecting a call originating from a calling party corresponding to the calling party identifier and from the first network;

in response to receiving the query, perform a lookup in a call control offload database using the calling party identifier to obtain call control offload routing information used for offloading call control services for a call involving the calling party identifier from the first network to a second network of a second protocol type different from the first protocol type and wherein the call offload routing information is usable to identify at least one IP multimedia subsystem (IMS) call session control function (CSCF) that facilitates providing of the call control services using nodes in the second network; and return the call control offload routing information to the switching office so that the switching office can use the routing information to offload call control services for the call to the second network.

30. A computer readable medium having stored thereon executable instructions that when executed by the processor of a computer control the computer to perform steps comprising:

at a call control offload function implemented at a network routing node:

receiving a query message in response to a switching office detecting a call originating from a calling party in a first network of a first protocol type;

in response to receiving the query message:

determining routing information for a node in a second network of a second protocol type different from the first protocol type based on information identifying the calling party; and offloading call control services to the second network using the node, wherein the node in the second network comprises an IP multimedia subsystem (IMS) call session control function (CSCF) that facilitates providing of the call control services using nodes in the second network, wherein offloading the call control services includes providing the routing information to the switching office and so that the switching office can use the routing information to offload the call control services.

31. A computer readable medium having stored thereon executable instructions that when executed by the processor of a computer controls the computer to perform steps comprising:

at a call control offload function implemented at a network routing node:

receiving from a switching office and in response to the switching office detecting a call originating from a calling party in a first network of a first protocol type, a query requesting call control offload routing information that includes a calling party identifier;

in response to receiving the query:
  performing a lookup in a call control offload database using the calling party identifier to obtain call control offload routing information used for offloading call control services for the call to a second network of a second protocol type different from the first protocol type and wherein the call offload routing information is usable to identify at least one IP multimedia subsystem (IMS) call session control function (CSCF) that facilitates providing of the call control services using nodes in the second network; and
  returning the call control offload routing information to the switching office so that the switching office can use the routing information to offload the call control services.

* * * * *